US006212381B1

(12) United States Patent
Oda

(10) Patent No.: US 6,212,381 B1
(45) Date of Patent: *Apr. 3, 2001

(54) MOBILE TELEPHONE WITH HANDOFF BETWEEN MICROCELL AND MACROCELL BASED ON PAST MOVING SPEED

(75) Inventor: Toshiyuki Oda, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/059,925

(22) Filed: Apr. 14, 1998

(30) Foreign Application Priority Data

Apr. 16, 1997 (JP) .................................... 9-097835

(51) Int. Cl.$^7$ ...................................... H04Q 7/20
(52) U.S. Cl. ........................ 455/441; 455/444; 455/437
(58) Field of Search ..................................... 455/441, 436, 455/437, 438, 439, 440, 442, 443, 444; 370/331

(56) References Cited

U.S. PATENT DOCUMENTS

| 5,548,806 | * | 8/1996 | Yamaguchi et al. ............... 455/441 |
| 5,711,004 | * | 1/1998 | Blasiak et al. ................... 455/436 |
| 5,711,005 | * | 1/1998 | Farrag ............................. 455/441 |
| 5,903,838 | * | 5/1999 | Yazaki et al. .................... 455/434 |
| 5,907,808 | * | 5/1999 | Vaara et al. ..................... 455/441 |

FOREIGN PATENT DOCUMENTS

| 0 589 279 A2 | 3/1994 | (EP) . |
| 0 660 627 A2 | 6/1995 | (EP) . |
| 2 242 806 | 10/1991 | (GB) . |
| 2 284 725 | 6/1995 | (GB) . |
| 2 292 288 | 2/1996 | (GB) . |
| 59-15573 | 4/1984 | (JP) . |
| 6-224828 | 8/1994 | (JP) . |
| 6-252837 | 9/1994 | (JP) . |
| 7-274233 | 10/1995 | (JP) . |
| 7-298339 | 11/1995 | (JP) . |
| 8-256835 | 10/1996 | (JP) . |
| WO 97/00587 | 1/1997 | (WO) . |

* cited by examiner

Primary Examiner—Reinhard Eisenzopf
Assistant Examiner—Duc Nguyen
(74) Attorney, Agent, or Firm—Scully, Scott, Murphy & Presser

(57) ABSTRACT

A mobile telephone capable of calling using a first calling system such as a personal handyphone system of being hand-off disabling at a moving speed more than the predetermined moving speed of the mobile telephone and a second calling system such as a personal digital cellular system of being hand-off enabling irrespective of the predetermined moving speed. A speed detector detects the moving speed of the mobile telephone itself, and a record holder stores the moving speed for a past predetermined time, detected by the speed detector. A central processing unit controls the calling using the first and second calling systems on the basis of the moving speed for the past predetermined time, resulting in improving reliability of line connection during moving, further improving using efficiency of the mobile telephone, and carrying out a more precise detection of a moving speed of the mobile telephone.

11 Claims, 2 Drawing Sheets

MOBILE TELEPHONE WITH HANDOFF BETWEEN MICROCELL AND MACROCELL BASED ON PAST MOVING SPEED

BACKGROUND OF THE INVENTION

The present invention relates to a mobile telephone capable of calling using two different calling systems such as a personal digital cellular system (PDC) employed in a cellular phone and a personal handyphone system (PHS) in a cordless telephone.

Description of the Related Art

Conventional mobile telephones have been widely used as information terminals capable of talking during moving. In such mobile telephones, two different calling systems, the personal digital cellular system (PDC) (called "a large scale cell system" hereinafter) used in a cellular phone and the personal handyphone system (PHS) (called "a small scale cell system" hereinafter) employed in a cordless phone have been widely used.

In the PDC, a user can talk during a high speed moving. However, a large consumption current is required and a calling charge is high. In the PHS, a telephone call cannot be done during a high speed moving. But, a consumption current is small and a calling charge is small. These two different systems have both merits and demerits.

In practice, when a telephone is connected in the PHS, as often occurring in moving by an automobile, while a high speed moving and a low speed moving are repeated, a user can talk when the automobile moves at a low speed, for example, waiting at a traffic signal. However, when the automobile moves again and the telephone is suddenly disconnected at a hand-off disabling speed. Such a trouble takes place on a train moving again after stopping at a station in the same manner.

In the PHS, during the telephone call, the call can be disconnected as the terminal moves at the hand-off disabling speed. In order to prevent this trouble, the PDC can be used. However, as described above, the PDC requires the large consumption current and the high calling charge, and the full time use is expected to be avoided.

In order to solve this problem, other mobile telephones capable of using the PDC and the PHS have been proposed. In these mobile telephones, the two calling systems can be switched depending on the using situation so as to make the best use of both the merits.

One mobile telephone of this kind is disclosed in Japanese Patent Laid-Open Publication No. 6-224828, as entitled "Micro Cell/Macro Cell Integrated Mobile Communication System", Akira YAMAGUCHI et al. In this telephone in which a plurality of calling systems are integrated in one terminal, a moving speed of the terminal is estimated from a receiving level change, and the systems are switched depending on the moving speed even during the talking, with the result of applying both the merits.

Another mobile telephone of this kind is disclosed in Japanese Patent Laid-Open Publication No. 59-15573, as entitled "Telephone To Be Mounted To Mobile Body," Akiho SASAKI et al. In this telephone, a moving speed of a terminal is detected, and the calling systems are switched on the basis of the moving speed, utilizing both the merits.

In the first conventional telephone, it is necessary to measure the receiving levels of a plurality of radio control channels transmitted from base stations and their change with the elapse of time. However, now, there is no hope of realizing the hand-off between the two different systems such as the PDC and the PHS of different enterprising parties. In this case, the moving speed can not be measured. Moreover, the receiving level varies largely depending on states of propagation paths, and the precise moving speed of the terminal cannot be estimated.

In the second conventional telephone, a method of linking the motion between a speedometer of a mobile body and a terminal is proposed in order to detect the moving speed of the terminal. However, in this method, when the terminal is used on a train or the like, the detection of the moving speed cannot be carried out.

SUMMARY OF THE INVENTION

It is therefore an object of the present invention to provide a mobile telephone in view of the aforementioned problems of the prior art, which is capable of improving reliability of line connection during moving, further improving using efficiency of the mobile telephone, and carrying out a more precise detection of a moving speed of the mobile telephone.

In accordance with one aspect of the present invention, there is provided a mobile telephone capable of calling using a first calling system of being hand-off disabling at a speed more than a predetermined moving speed of the mobile telephone and a second calling system of being hand-off enabling irrespective of the predetermined moving speed, comprising speed detecting means for detecting the moving speed of the mobile telephone itself; storing means for storing the moving speed detected by the speed detecting means for a past predetermined time; and calling control means for controlling the calling using the first and second calling systems on the basis of the moving speed for the past predetermined time, which is stored in the storing means.

According to the present invention, the detected moving speed of the mobile telephone itself in the predetermined time interval from the past time to the present time is once stored, and the calling system is controlled on the basis of the stored moving speed. As a result, the using efficiency of the mobile telephone can be improved and the reliability of the line connection can be improved in comparison with a conventional mobile telephone in which the calling system is controlled depending on only the present moving speed of the mobile telephone.

A mobile telephone, preferably, further comprises time setting means for setting the predetermined time by a user; and a timer for counting the predetermined time.

The user can set the predetermined time interval and the predetermined limit speed, and these values can be changed depending on the using situation of the mobile telephone, whereby the using efficiency of the telephone can be further improved.

A mobile telephone can further comprises a gyro for changing an output voltage depending on an acceleration given to the mobile telephone, and the speed detecting means detects the moving speed on the basis of the voltage output from the gyro.

The gyro detects the acceleration of the mobile telephone in order to detect the moving speed of the telephone, and the more precise detection of the moving speed of the telephone can be carried out.

In another mobile telephone of the present invention, the storing means discriminates whether or not the moving speed for the past predetermined time is more than the predetermined moving speed, and, when the moving speed for the past predetermined time is more than the predetermined moving speed, the calling control means prevents the calling by the first calling system.

Hence, when the moving speed of the mobile telephone in the past predetermined time interval is beyond the predetermined speed, the calling by the hand-off disabling system is prevented. At calling, even when the moving of the mobile telephone itself is stopped and is reduced below the predetermined speed and the calling by the hand-off disabling system is selected, such a calling by the hand-off disabling system cannot be permitted so as to foresee the possibility that the moving speed of the telephone rises thereafter beyond the predetermined speed. Thus, the using efficiency of the mobile telephone can be further improved.

In a mobile telephone, more preferably, the first calling system is a personal handyphone system, and the second calling system is a personal digital cellular system.

In the mobile telephone of the present invention, the calling is carried out using both the PHS which is small in consumption power and small in calling charge although the calling cannot be done during the high speed moving, and the PDC which makes the calling possible during the high speed moving but which is large in consumption power and high in calling charge. As a result, the using efficiency of the telephone can be further improved.

BRIEF DESCRIPTION OF THE DRAWINGS

The objects, features and advantages of the present invention will become more apparent from the consideration of the following detailed description, taken in conjunction with the accompanying drawings, in which.

DESCRIPTION OF THE PREFERRED EMBODIMENTS

Figure 1:
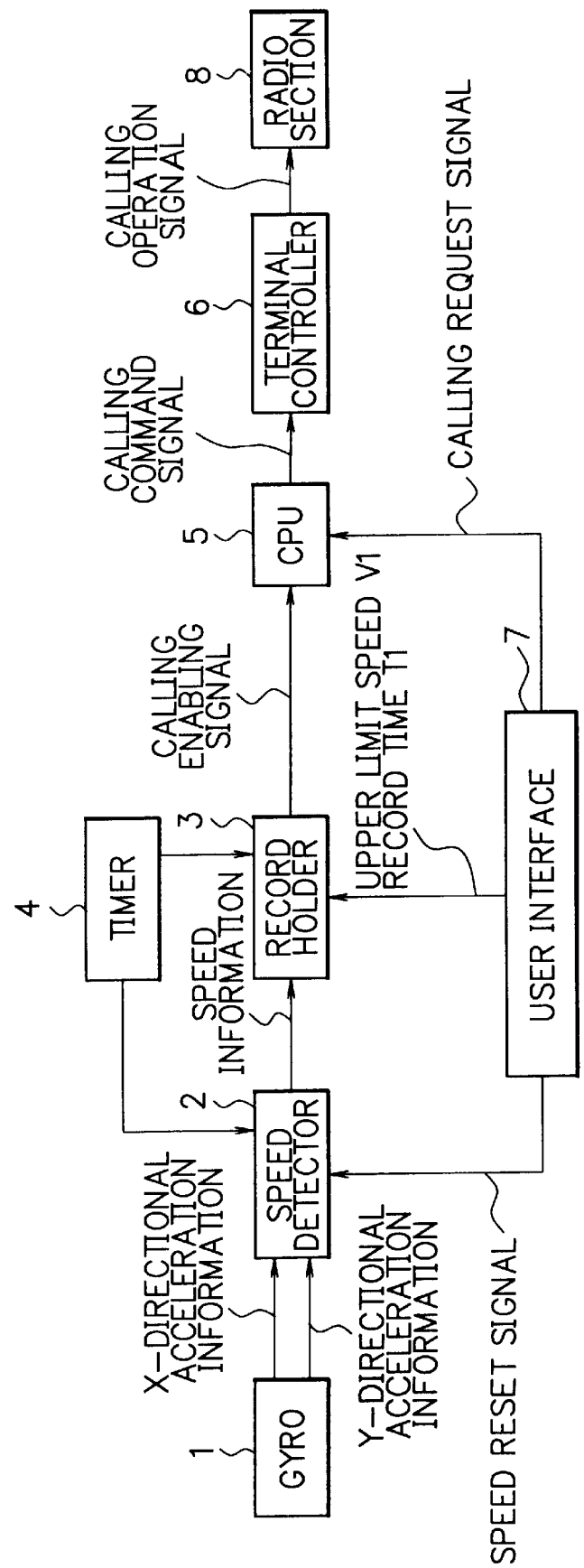
FIG. 1 is a block diagram of a pocket telephone according to the present invention.

Referring now to the drawings, there is shown in FIG. 1. a mobile telephone (or simply called "terminal" hereinafter) according to one embodiment of the present invention.

In this terminal, as shown in FIG. 1, a gyro 1 detects an acceleration of the terminal itself to output the detected acceleration information to a speed detector 2. The speed detector 2 detects the present moving speed of the terminal on the basis of the acceleration information received from the gyro 1 to output speed information at a past certain time to a record holder 3. The record holder 3 holds the speed information output from the speed detector 2. A timer 4 counts a predetermined time interval to output time information to the speed detector 2 and the record holder 3. A CPU 5 controls the operation of the whole terminal. A terminal controller 6 controls the terminal on the basis of the control of the CPU 5. A user interface 7 outputs values set by the user to the speed detector 2, the record holder 3 and the CPU 5. A radio section 8 performs a calling operation.

Figure 2:
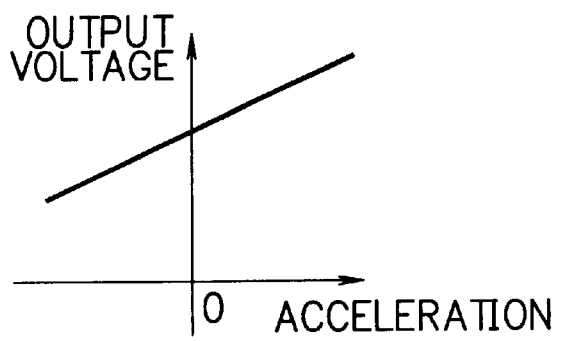
FIG. 2 is a graphical representation showing a relationship between acceleration and output voltage of a gyro of the pocket telephone shown in FIG. 1.

The gyro 1 changes the output voltage depending on the acceleration given to the terminal. This output voltage variation with respect to the acceleration is shown in FIG. 2. In FIG. 2, the vertical axis shows the output voltage from the gyro 1 and the horizontal axis shows the present acceleration given to the terminal. This voltage is output in the X-direction and the Y-direction perpendicular thereto, respectively.

The speed detector 2 receives the acceleration information from the gyro 1, the time information from the timer 4, and a speed reset signal from the user interface 7, and calculates the present moving speed of the terminal precisely.

The record holder 3 receives the speed information from the speed detector 2, the time information from the timer 4, and a record hold time T1 and a small scale cell connection upper limit speed V1 from the user interface 7 to hold them and outputs a calling enabling signal to the CPU 5. The CPU 5 receives a calling request signal from the user interface 7 and the calling enabling signal from the record holder 3 to output a calling command signal to the terminal controller 6. In response to the calling command signal from the CPU 5, the terminal controller 6 outputs a calling operation signal to the radio section 8 so that the radio section 8 carries out the calling operation.

The user interface 7 outputs the speed reset signal to the speed detector 2, sets the record hold time T1 and the small scale cell connection upper limit speed Vi for the record holder 3, and outputs the calling request signal to the CPU 5.

Next, an operation of the above-described terminal (mobile telephone) according to the present invention will be described in detail.

In this embodiment, a terminal in which the PDC and the PHS are integrated is used in a moving automobile. Further, it is assumed that a PDC mode and a PHS mode do not mutually change during a calling or a call waiting. A driver should not use the telephone during the driving, and a user is a fellow passenger.

First, the user sets a record hold time T1 and a small scale cell connection upper limit speed V1 in the user interface 7, and resets the speed to set the initial speed of 0 km/h to the speed detector 2 when the automobile is stopped.

While the automobile is moved, a present moving speed of the terminal is detected using the gyro 1, the speed detector 2 and the timer 4 in the terminal, and the moving speed in the record time interval T1 from the past time to the present time among the detected moving speeds is held in the record holder 3.

Figure 3:
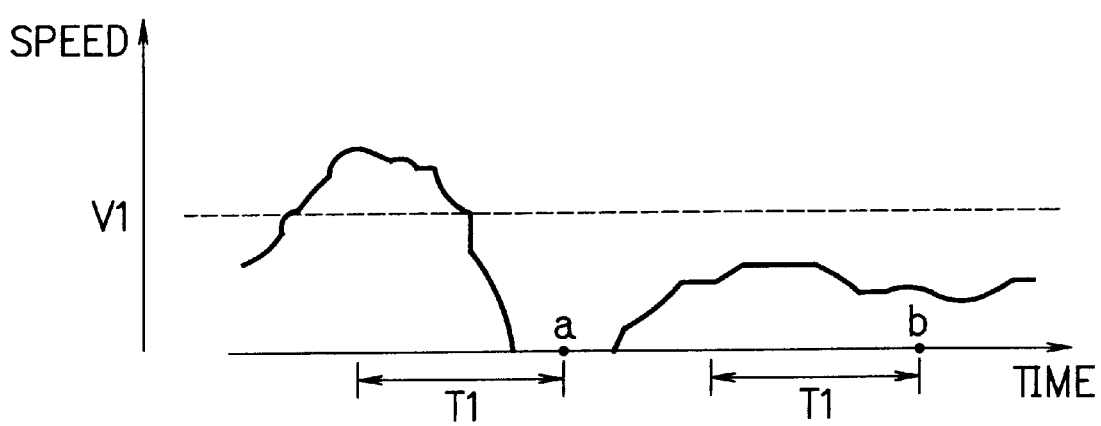
FIG. 3 is a graphical representation showing a relationship between time and moving speed of the pocket telephone shown in FIG. 1

A holding situation of the moving speeds in the record holder 3 is shown in FIG. 3 which illustrates the relationship between the elapsed time and the moving speed of the terminal. As shown in FIG. 3, according to the present invention, it is important whether or not the moving speed of the terminal is beyond the small scale cell connection upper limit speed V1 set in the user interface 7 in the past predetermined time interval T1 at the certain time, for example, the point a or b.

That is, when the moving speed of the terminal is beyond the small scale cell connection upper limit speed V1 at any time in the past predetermined time interval T1, the calling by the small scale cell system (PHS) cannot be used. For example, as shown in FIG. 3, at the time a, the moving speed of the terminal is far beyond the small scale cell connection upper limit speed Vi in the past time interval T1 and the calling in the PHS mode (the small scale cell system) cannot be carried out. However, it is clear that at the time b, the moving speed of the terminal is below the small scale cell connection upper limit speed V1 in the past time interval T1 and the calling in the PHS mode can be done.

The record holder 3 discriminates whether or not the moving speed of the terminal is beyond the small scale cell connection upper limit speed V1 in the past predetermined time interval T1 at the certain time. When it is possible to call in the PHS mode, the record holder 3 sends a PHS calling possible signal as the calling enabling signal to the CPU 5. In the CPU 5, only when a calling request in the PHS mode is input from the user interface 7 and the PHS calling possible signal is received, a calling command signal is output to the terminal controller 6. In response to the calling command signal, the terminal controller 6 outputs a calling operation signal to the radio section 8 in order to allow the radio section 8 to carry out the calling operation.

In this embodiment, as mentioned above, the moving speed of the terminal at the certain time interval is held in the record holder 3, and the CPU 5 controls the calling system on the basis of the held moving speed. Thus, by considering not only the present moving speed but also the past moving speed of the terminal, even when the terminal is moved from its stopped state while calling, its calling cannot be disconnected, resulting in improving the using efficiency of the terminal.

As clear from the above description, according to the present invention, the calling system is selected in the light of the past moving speed of the terminal, and, while a high speed moving and a low speed moving are repeated, the telephone line connected by the small scale cell system in the low speed moving state cannot be disconnected when the terminal is returned to the high speed moving state.

In other words, the detected moving speed of the mobile telephone itself in the predetermined time interval from the past time to the present time is once stored, and the calling system is controlled on the basis of the stored moving speed. As a result, the using efficiency of the mobile telephone can be improved and the reliability of the line connection can be improved in comparison with a conventional mobile telephone in which the calling system is controlled depending on only the present moving speed of the mobile telephone.

Moreover, the user can set the predetermined time interval and the predetermined limit speed, and these values can be changed depending on the using situation of the mobile telephone, whereby the using efficiency of the telephone can be further improved.

Further, the gyro detects the acceleration of the mobile telephone in order to detect the moving speed of the telephone, and the more precise detection of the moving speed of the telephone can be carried out.

In addition, when the moving speed of the mobile telephone in the past predetermined time interval is beyond the predetermined speed, the calling by the hand-off disabling system is prevented. At calling, even when the moving of the mobile telephone itself is stopped and is reduced below the predetermined speed and the calling by the hand-off disabling system is selected, such a calling by the hand-off disabling system cannot be permitted so as to foresee the possibility that the moving speed of the telephone rises thereafter beyond the predetermined speed. Thus, the using efficiency of the mobile telephone can be further improved.

Furthermore, in the mobile telephone of the present invention, the calling is carried out using both the PHS which is small in consumption power and small in calling charge although the calling cannot be done during the high speed moving, and the PDC which makes the calling possible during the high speed moving but which is large in consumption power and high in calling charge. As a result, the using efficiency of the telephone can be further improved.

While the present invention has been described in its preferred embodiments with reference to the accompanying drawings, it will be appreciated that various changes and modifications can be made by those skilled in the art without departing from the spirit and scope of the present invention.

What is claimed is:

1. A mobile telephone capable of calling using a first calling system of being hand-off disabling at a past moving speed more than a predetermined moving speed of the mobile telephone and a second calling system of being hand-off enabling irrespective of the predetermined moving speed, comprising:

speed detecting means for detecting the moving speed of the mobile telephone itself;

storing means for storing the past moving speed detected by the speed detecting means for a past predetermined time; and calling control means for controlling the calling using the first and second calling systems on the basis of the past moving speed for the past predetermined time, which is stored in the storing means.

2. A mobile telephone of claim 1, further comprising:

time setting means for setting the predetermined time by a user; and a timer for counting the predetermined time.

3. A mobile telephone of claim 2, further comprising a gyro for changing an output voltage depending on an acceleration given to the mobile telephone, wherein the speed detecting means detects the moving speed on the basis of the voltage output from the gyro.

4. A mobile telephone of claim 3, wherein the first calling system is a personal handyphone system, and the second calling system is a personal digital cellular system.

5. A mobile telephone of claim 2, wherein the storing means discriminates whether or not the past moving speed for the past predetermined time is more than the predetermined moving speed, and, when the past moving speed for the past predetermined time is more than the predetermined moving speed, the calling control means prevents the calling by the first calling system.

6. A mobile telephone of claim 2, wherein the first calling system is a personal handyphone system, and the second calling system is a personal digital cellular system.

7. A mobile telephone of claim 1, further comprising a gyro for changing an output voltage depending on an acceleration given to the mobile telephone, wherein the speed detecting means detects the moving speed on the basis of the voltage output from the gyro.

8. A mobile telephone of claim 7, wherein the storing means discriminates whether or not the past moving speed for the past predetermined time is more than the predetermined moving speed, and, when the past moving speed for the past predetermined time is more than the predetermined moving speed, the calling control means prevents the calling by the first calling system.

9. A mobile telephone of claim 7, wherein the first calling system is a personal handyphone system, and the second calling system is a personal digital cellular system.

10. A mobile telephone of claim 1, wherein the storing means discriminates whether or not the past moving speed for the past predetermined time is more than the predetermined moving speed, and, when the past moving speed for the past predetermined time is more than the predetermined moving speed, the calling control means prevents the calling by the first calling system.

11. A mobile telephone of claim 1, wherein the first calling system is a personal handyphone system, and the second calling system is a personal digital cellular system.

* * * * *